(12) United States Patent
Kim et al.

(10) Patent No.: US 12,189,054 B2
(45) Date of Patent: Jan. 7, 2025

(54) TDM FMCW RADAR APPARATUS AND SIGNAL PROCESSING METHOD OF APPARATUS

(71) Applicant: SMART RADAR SYSTEM, INC., Seongnam-si (KR)

(72) Inventors: Yong Jae Kim, Yongin-si (KR); Jeong Min Choi, Hwaseong-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 383 days.

(21) Appl. No.: 17/584,372

(22) Filed: Jan. 25, 2022

(65) Prior Publication Data

US 2023/0176187 A1     Jun. 8, 2023

(30) Foreign Application Priority Data

Dec. 2, 2021   (KR) .................. 10-2021-0171135

(51) Int. Cl.
  *G01S 7/40*      (2006.01)
  *G01S 13/34*     (2006.01)
  *G01S 13/58*     (2006.01)

(52) U.S. Cl.
  CPC .......... *G01S 7/4056* (2013.01); *G01S 13/343* (2013.01); *G01S 13/583* (2013.01)

(58) Field of Classification Search
  CPC ........... G01S 2013/0245; G01S 13/343; G01S 13/584; G01S 13/931; G01S 13/42; G01S 13/282; G01S 13/582; G01S 13/347; G01S 7/356; G01S 7/354; G01S 7/2883; G01S 7/0235
  USPC .................................. 342/173, 109, 200, 107
  See application file for complete search history.

(56) References Cited

U.S. PATENT DOCUMENTS

| | | | | |
|---|---|---|---|---|
| 4,875,050 | A * | 10/1989 | Rathi ................... | G01S 13/288 342/201 |
| 9,128,175 | B2 * | 9/2015 | Matsuura .............. | G01S 15/104 |
| 9,448,302 | B2 * | 9/2016 | Schoor .................. | G01S 7/4008 |
| 9,448,303 | B2 * | 9/2016 | Kishigami ............ | G01S 13/284 |
| 9,730,219 | B2 * | 8/2017 | Rambach ............. | G01S 13/931 |
| 10,649,076 | B2 * | 5/2020 | Schoor .................. | G01S 13/583 |

(Continued)

OTHER PUBLICATIONS

Extended Search Report mailed Apr. 13, 2023 from the European Patent Office for European Application No. 22205609.5.
Sun Shunqiao et al: "MIMO Radar for Advanced Driver-Assistance Systems and Autonomous Driving: Advantages and Challenges", IEEE Signal Processing Magazine, IEEE, USA, vol. 37, No. 4, Jun. 29, 2020 (Jun. 29, 2020), pp. 98-117, XP011796877, ISSN: 1053-5888, DOI: 10.1109/MSP.2020.2978507 [retrieved on Jun. 27, 2020].

(Continued)

*Primary Examiner* — Vladimir Magloire
*Assistant Examiner* — Michael W Justice
(74) *Attorney, Agent, or Firm* — Insight Law Group, PLLC; Seung Lee

(57) ABSTRACT

Transmitting antennas and receiving antennas are arranged such that a plurality of virtual antennas have the same position in a time-division-multiplexed (TDM) frequency modulated continuous wave (FMCW) radar apparatus. At least three peculiar chirps, at least one of which is included in a chirp loop of each of waveform signals transmitted by the plurality of virtual antennas having the same position, are respectively positioned in consecutive time slots and have different periods. A Doppler frequency may be uniquely determined from phase difference values between the at least three peculiar chirps respectively positioned in consecutive time slots measured from FMCW radar signals received at the plurality of virtual antennas.

10 Claims, 14 Drawing Sheets

(56) References Cited

U.S. PATENT DOCUMENTS

| | | | |
|---|---|---|---|
| 11,035,932 B2* | 6/2021 | Matsumoto | G01S 13/343 |
| 11,486,994 B2* | 11/2022 | Kishigami | G01S 13/42 |
| 11,513,187 B2* | 11/2022 | Stettiner | G01S 7/2883 |
| 11,525,886 B2* | 12/2022 | Stettiner | G01S 13/346 |
| 11,525,908 B2* | 12/2022 | Laghezza | G01S 13/536 |
| 11,609,303 B2* | 3/2023 | Stettiner | G01S 7/2883 |
| 11,899,133 B2* | 2/2024 | Sturm | G01S 13/931 |
| 11,940,524 B2* | 3/2024 | Kishigami | G01S 13/284 |
| 2014/0085128 A1* | 3/2014 | Kishigami | G01S 7/42 342/147 |
| 2014/0253365 A1 | 9/2014 | Kirsch et al. | |
| 2014/0347211 A1* | 11/2014 | Schoor | G01S 13/02 342/147 |
| 2015/0295628 A1* | 10/2015 | Rambach | H04B 7/0413 370/337 |
| 2017/0131396 A1* | 5/2017 | Schoor | G01S 13/0209 |
| 2017/0242116 A1* | 8/2017 | Kishigami | G01S 13/581 |
| 2019/0113602 A1* | 4/2019 | Matsumoto | G01S 13/584 |
| 2019/0353769 A9* | 11/2019 | Schoor | G01S 13/0209 |
| 2020/0103515 A1* | 4/2020 | Kishigami | G01S 13/284 |
| 2020/0150260 A1 | 5/2020 | Lang et al. | |
| 2021/0156980 A1* | 5/2021 | Stettiner | G01S 7/2883 |
| 2021/0156981 A1* | 5/2021 | Stettiner | G01S 13/931 |
| 2021/0156982 A1* | 5/2021 | Stettiner | G01S 7/35 |
| 2021/0255303 A1* | 8/2021 | Laghezza | G01S 7/415 |
| 2021/0278501 A1* | 9/2021 | Sturm | G01S 7/356 |
| 2022/0120884 A1* | 4/2022 | Subburaj | G06F 16/9017 |
| 2022/0171048 A1* | 6/2022 | Kishigami | G01S 13/343 |
| 2023/0008565 A1* | 1/2023 | Kishigami | G01S 13/42 |

OTHER PUBLICATIONS

Sandeep Rao: "MIMO Radar", Jul. 26, 2018 (Jul. 26, 2018), pp. 1-13, XP055609875, Retrieved from the Internet: URL:http://www.ti.com/1it/an/swra554a/swra 554a.pdf [retrieved on Jul. 30, 2019].

Roos Fabian et al: "Enhancement of Doppler Unambiguity for Chirp-Sequence Modulated TDM-MIMO Radars", 2018 IEEE MTT-S International Conference On Microwaves for Intelligent Mobility (ICMIM), IEEE, Apr. 15, 2018 (Apr. 15, 2018), pp. 1-4, XP033391296, DOI: 10.1109/ICMIM.2018.8443352 [retrieved on Aug. 21, 2018].

Roos, Fabian, et al. "Enhancement of Doppler Unambiguity for Chirp Sequence Modulated TDM MIMO Radars", 2018 IEEE MTT-S International Conference on Microwaves for Intelligent Mobility (ICMIM), IEEE, 2018.

Schmid, Christian M., et al., "Motion compensation and efficient array design for TDMAN FMCW MIMO radar systems", 2012 6th European conference on Antennas and Propagation (EUCAP), IEEE, 2012.

Wojtkiewicz, Andrzej, et al. "Two-dimensional signal processing in FMCW radars", Proc. XXKKTOiUE (1997). 475-480.

Matthieas Kronauge and Hermann Rohling, "New chirp sequence radar waveform", IEEE Transactions on Aerospace and Electronic Systems 50.4 (2014); 2870-2877.

Non-final Office Action mailed on Jan. 23, 2024 from the Korean Intellectual Property Office for Korean Application No. 10-2021-0171135.

* cited by examiner

TDM FMCW RADAR APPARATUS AND SIGNAL PROCESSING METHOD OF APPARATUS

This application claims priority from Korean Patent Application No. 10-2021-0171135, filed on Dec. 2, 2021, in the Korean Intellectual Property Office, the disclosure of which is incorporated herein by reference in its entirety.

BACKGROUND

1. Field

A signal processing technique for a time-division-multiplexed (TDM) frequency modulated continuous wave (FMCW) radar apparatus is disclosed.

2. Description of Related Art

A multiple-input-multiple-output (MIMO) frequency modulated continuous wave (FMCW) radar apparatus achieves improved angle resolution at low cost using multiple transmitting antennas and multiple receiving antennas. A time-division-multiplexed (TDM) MIMO radar apparatus distinguishes a transmission waveform signal at the receiving antenna using a time-division multiplexing (TDM) scheme.

<Description of FIG. 1>

FIG. 1 illustrates an antenna array, which is composed of TX transmitting antennas and RX receiving antennas, in an exemplary FMCW radar apparatus. In the exemplary TDM FMCW radar apparatus, the TX transmitting antennas sequentially transmit an FMCW radar waveform signal, and each transmitted FMCW radar waveform signal is reflected by a target and simultaneously received by the RX receiving antennas. The transmitting antennas and the receiving antennas are generally linearly arranged at equal intervals, but may also be non-linearly arranged at non-uniform intervals. As illustrated in the drawing, when a jth receiving antenna receives a signal transmitted by an ith transmitting antenna, substantially the same signal as a signal in a case in which a virtual transmitting/receiving antenna is positioned at a position of (i, j) may be acquired. The virtual transmitting/receiving antenna is a case in which a transmitting antenna and a receiving antenna are positioned in substantially the same place, and is referred to herein as a "virtual antenna."

<Description of FIG. 2>

FIG. 2 is a diagram illustrating an example of range-Doppler processing for estimating a range and a velocity from a TDM FMCW radar signal. In the TDM FMCW radar apparatus, one frame is composed of $N_C$ chirps which are repeatedly transmitted $N_{Loop}$ times in a time division scheme from each of the $N_{TX}$ transmitting antennas. That is, $N_C = N_{TX} \times N_{Loop}$. As illustrated in the drawing, the range-Doppler processing is equally performed for all virtual antennas. For example, in the TDM FMCW radar apparatus having an array composed of $N_{TX}$ transmitting antennas and $N_{RX}$ receiving antennas, the range-Doppler processing as illustrated in FIG. 2 may be performed for each of $N_{TX} \times N_{RX}$ virtual antennas.

As illustrated in the drawing, when the transmitting antennas sequentially transmit an FMCW radar waveform signal, a receiving antenna $RX_1$ receives all reflected waves reflected from one or more targets like other receiving antennas. A phase difference between a signal transmitted from the transmitting antenna and a signal received at the receiving antenna depends on a range from the transmitting antenna to the receiving antenna via the target. A frequency difference between transmitting and receiving signals is referred to as a beat frequency, and this beat frequency may be estimated from a position of a peak, that is, an FFT index, of output coefficients of a range fast Fourier transform (FFT). Since the beat frequency has a one-to-one correspondence with the range to the target, the range to the target may be estimated by estimating the beat frequency.

In FIG. 2, a signal of a virtual antenna at a position of (0, 1), that is, a virtual antenna in a case in which a 1st receiving antenna receives a signal transmitted by a 0th transmitting antenna will be described as an example. First, range FFT processors 210-1 to 210-$N_{Loop}$ perform intra-chirp processing.

A difference between a transmission signal transmitted in a first chirp loop of a frame from a transmitting antenna $TX_0$ and a signal that is reflected by a target and received by a receiving antenna $RX_1$ is sampled, transformed into a frequency domain by the range FFT processor 210-1 in units of chirps, and stored for each coefficient in a buffer 230-1. A difference between a transmission signal transmitted in a second chirp loop of the frame from the transmitting antenna $TX_0$ and a signal that is reflected by the target and received by the receiving antenna $RX_1$ is sampled, transformed into a frequency domain by the range FFT processor 210-2 in units of chirps, and stored for each coefficient in a buffer 230-2. A difference between a transmission signal transmitted in a last chirp loop of the frame from the transmitting antenna $TX_0$ and a signal that is reflected by the target and received by the receiving antenna $RX_1$ is sampled, transformed into a frequency domain by the range FFT processor 230-$N_{Loop}$ in units of chirps, and stored for each coefficient in a buffer 230-$N_{Loop}$. The beat frequency may be estimated through a process of finding a position of a peak, which is a shaded portion in the drawing, among coefficients stored in the buffer, and from this, a range to the target may be obtained.

Meanwhile, when the target moves, a range between the radar apparatus and the target varies with time, and which is referred to as range migration. The range migration results in a change in a phase of the FMCW radar signal, and the degree of phase change is determined by a radial speed of the target. Accordingly, the radial speed of the target may be estimated by observing the phase change over time. As the total time for observing the phase change increases, even a small phase change may be detected, so that a radial speed resolution is improved. On the other hand, as an interval for observing the phase change is reduced, a faster change may be detected, so that a limit of a detectable radial speed is increased.

In order to estimate the range and the radial speed of the target from the signal received from one virtual antenna, a 2-dimensional spectral estimation scheme such as a two-dimensional (2D)-FFT or 2D-multiple signal classification (MUSIC) is applied to a range-Doppler matrix. A range-angle matrix is obtained from the MIMO antenna array, and at this point, a dimension of an angle is increased as much as a size of a virtual array.

In the example of FIG. 2, each of Doppler FFT processors 250-1 to 250-M performs inter-chirp processing. Each of the Doppler FFT processors 250-1 to 250-M receives as many output coefficients as the number of the range FFT processors 210-$N_{Loop}$, that is, $N_{Loop}$ output coefficients corresponding to the same frequency, performs FFT on the output coefficients, and stores the transformed coefficients in a 2D buffer 270. As many as the number of the output coefficients of the range FFT processors 210-1 to 210-$N_{Loop}$, that is, M Doppler FFT processors 250-1 to 250-M are provided. The buffer 270 stores range-Doppler spectrum values obtained through a range FFT and a Doppler FFT. A Doppler frequency may be determined by identifying a position of a peak, for example, a shaded portion in the drawing, from the Doppler FFT output spectrum stored in the buffer 270, and the radial speed of the target may be obtained from the Doppler frequency.

The Doppler FFT is applied to signals captured from the same TX-RX channel or virtual antenna. Signals received from different channels have different initial phases due to physical positions of the transmitting and receiving antennas respectively corresponding to the channels and an angle at which the target is positioned. Thus, a TDM FMCW system should always use only a signal obtained from the same channel as a Doppler FFT input thereof in order to purely observe only a phase change according to a time change.

In the TDM FMCW system, when a length of one chirp is expressed as $T_{chirp}$, a time difference between input samples of the Doppler FFT becomes $T_{loop}=T_{chirp} \times N_{TX}$, because radio waves are transmitted sequentially from the Nix transmitting antennas. At this point, when a range change rate due to a movement of the target, that is, the radial speed, is expressed as $v_r$, the Doppler frequency is given as $f_d=2v_r/\lambda$. Here, $\lambda$ refers to a length of one wavelength. At this point, when a phase difference between the input samples of the Doppler FFT is expressed as $\Delta f$, a relationship of $\Delta f=2\pi f_d T_{loop}$ is established.

In order to estimate a spectrum without having an aliasing phenomenon, sampling should be performed at least twice during one period according to the Nyquist sampling theory. This means that the phase difference between the samples should be within $\pm\pi$. That is, in order to normally estimate the radial speed of the target, the following conditions should be satisfied, $$|2\pi f_d T_{loop}| < \pi \qquad \text{[Equation 1]}$$

Since $T_{loop}$ is always a positive number, by using a relationship of $f_d=2v_r/\lambda$, Equation (1) may be expressed as follows, $$|v_r| < \frac{\lambda}{4T_{loop}}. \qquad \text{[Equation 2]}$$

That is, in the TDM FMCW, as the number of the transmitting antennas increases, $T_{loop}$ increases, and thus a maximum value of a measurable radial speed in an aliasing-free condition decreases in proportion to the number of the transmitting antennas. For example, in a case of a 77 GHz radar system in which there are 12 transmitting antennas and a length of one chirp is 40 ms, the maximum measurable radial speed is merely about +/−7.3 km/h.

FIG. 3 illustrates velocity spectra that may be estimated from a Doppler FFT output spectrum. As illustrated in the drawing, the velocity spectra estimated from the Doppler FFT output spectrum include an observable spectrum and an aliased spectrum, and the velocity obtained from these may include a true velocity and a measured velocity, and thus a Doppler ambiguity problem arises. Thus, as illustrated in FIG. 3, it is difficult to accurately estimate the radial speed of the target due to the aliasing phenomenon when the target moves beyond a maximum measurable radial speed limit as in the example of FIG. 3. Since incorrectly estimating the radial speed of the target has a decisive effect on an error in estimating the angle of the target, such a Doppler ambiguity problem must be solved.

A method for solving such a problem has been disclosed in the related art (Roos, Fabian, et al. "Enhancement of Doppler unambiguity for chirp-sequence modulated TDM MIMO radars." disclosed at the 2018 IEEE MTT-S International Conference on Microwaves for Intelligent Mobility (ICMIM). IEEE, 2018, or Schmid, Christian M., et al. "Motion compensation and efficient array design for TDMA FMCW MIMO radar systems." disclosed at the 2012 6th European Conference on Antennas and Propagation (EU-CAP). IEEE, 2012). These papers have proposed an antenna arrangement of a particular structure in order to separate phase rotation due to the Doppler effect, and phase rotation components that are determined by a position of a target and a position of a virtual antenna. These methods primarily estimate a radial speed of the target on a range-Doppler spectrum, and estimate the radial speed of the target again using information about a phase change between the virtual antennas. However, such a method must design antennas to form a spatially long uniform virtual array in which transmitting antennas or receiving antennas are arranged at equal intervals of 0.5 times a wavelength. Otherwise, the antennas must be designed so that a significant number of virtual array elements overlap spatially. That is, since the degree of freedom of the antenna design is extremely limited, the related art is difficult to be applied to a sparse array, and problems such as antenna coupling and reduced angle resolution follow. In addition, even though the antennas are designed to satisfy the above design conditions, since the minimum time interval for measuring the phase rotation is $T_{chirp}$, the maximum estimable radial speed does not exceed a physical limit of Equation 2.

A method in which sub-frames having two or more different $T_{chirp}$ are concatenated and used is disclosed in another related art paper (Wojtkiewicz, Andrzej, et al. "Two-dimensional signal processing in FMCW radars." disclosed at Proc. XXKKTOiUE (1997): 475-480). Here, one frame is composed of several sub-frames. One sub-frame is structurally identical to a frame of the conventional TDM FMCW signal. However, since two or more sub-frames are used in this method, there are disadvantages in that a frame length is too long and data throughput is high. In addition, it is difficult to maximize a signal processing gain because a difference in start time between the sub-frames is large and thus signal coherency is lowered, and it is difficult to properly associate targets detected in each sub-frame when a range of the target is greatly changed due to range migration between the sub-frames.

In order to solve the range migration problem and the coherency problem of the above-descried paper, a method of performing interleaving on a time axis by adding a frequency deviation between sub-frames is proposed in still another related art paper (Kronauge, Matthias, and Hermann Rohling. "New chirp sequence radar waveform." disclosed at IEEE Transactions on Aerospace and Electronic Systems 50.4 (2014): 2870-2877). However, this method is also difficult to be used in practice because a frame length becomes too long as in the related art described above, even so, this method may be restrictively used only when a sampling rate is very low.

SUMMARY

This summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter.

The following description relates to proposing a method of increasing a limit of a detectable radial speed of a target at a given number of transmitting antennas in a time-division-multiplexed (TDM) frequency modulated continuous wave (FMCW) radar apparatus.

The following description also relates to increasing a detectable radial speed of a target but not increasing a frame length in a TDM FMCW radar apparatus.

The following description also relates to solving a Doppler ambiguity problem in a TDM FMCW radar apparatus.

The following description also relates to solving a Doppler ambiguity problem while minimizing an increase in frame length in a TDM FMCW radar apparatus.

The following description also relates to solving a Doppler ambiguity problem while minimizing additional constraints in antenna design in a TDM FMCW radar apparatus.

According to one aspect of the proposed invention, transmitting antennas and receiving antennas are arranged such that a plurality of virtual antennas have the same position in a TDM FMCW radar apparatus. At least three peculiar chirps, at least one of which is included in a chirp loop of each of waveform signals transmitted by the plurality of virtual antennas having the same position, are respectively positioned in consecutive time slots and have different periods. A Doppler frequency may be determined from phase difference values between the at least three peculiar chirps respectively positioned in consecutive time slots measured in FMCW radar signals received at the plurality of virtual antennas.

According to an additional aspect, at least three peculiar chirps, which are respectively positioned in consecutive time slots and have different periods, are configured to differ in at least one of an idle time between the peculiar chirps or a ramp time of the peculiar chirps.

According to an additional aspect, the at least three chirps respectively positioned in consecutive time slots are configured such that a sum of an inter-peculiar chirp difference value of the idle time and an inter-peculiar chirp difference value of the ramp time is limited by a target maximum detection rate of the target.

According to an additional aspect, a true value of the Doppler frequency may be determined from a phase difference between the peculiar chirps measured from at least three peculiar chirp signals having a period different from a measured value. Specifically, a Doppler frequency of the aliased spectrum, at which a theoretically calculated phase difference has the most similar value to the measured phase difference may be determined as a true Doppler frequency.

In an additional aspect, a search range for the Doppler frequencies of the aliased spectrum may be determined by a ratio of the maximum Doppler frequency of the target to be detected and of the maximum Doppler frequency obtained from a range-Doppler spectrum.

DETAILED DESCRIPTION

The foregoing and additional aspects of the present invention will be embodied through the following embodiments described with reference to the accompanying drawings. It should be understood that various combinations of components in each embodiment are possible unless otherwise specified or contradicted within the embodiment. It will be understood that words or terms used in the specification and claims should be interpreted as having a meaning that is consistent with their meaning in the context of the description and the technical idea of the proposed invention, based on the principle that an inventor is able to properly define the meaning of the words or terms to best explain the invention. Hereinafter, exemplary embodiments of the present invention will be described in detail with reference to the accompanying drawings.

Description of Claim 1 of Invention

According to one aspect, transmitting antennas and receiving antennas are arranged such that a plurality of virtual antennas have the same position in a time-division-multiplexed (TDM) frequency modulated continuous wave (FMCW) radar apparatus. At least three peculiar chirps, at least one of which is included in a chirp loop of each of waveform signals transmitted by the plurality of virtual antennas having the same position, are respectively positioned in consecutive time slots and have different periods. A Doppler frequency may be determined from phase difference values between the at least three peculiar chirps respectively positioned in consecutive time slots measured in FMCW radar signals received at the plurality of virtual antennas.

Figure 4:
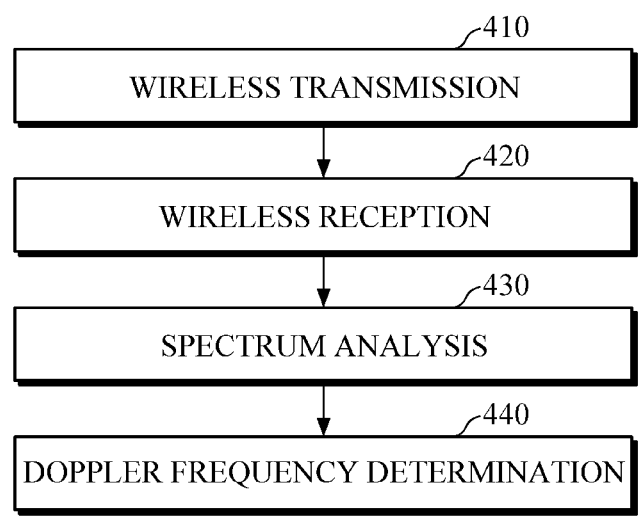
FIG. 4 is a flowchart illustrating a configuration of a signal processing method of a TDM FMCW radar apparatus according to an embodiment.

FIG. 4 is a flowchart illustrating a configuration of a signal processing method of a TDM FMCW radar apparatus according to an embodiment. As illustrated in the drawing, the signal processing method of the TDM FMCW radar apparatus according to an embodiment includes a wireless transmission operation 410, a wireless reception operation 420, a spectrum analysis operation 430, and a Doppler frequency determination operation 440.

The proposed invention describes a case of the TDM FMCW radar apparatus composed of an array of $N_{TX}$ transmitting antennas and $N_{RX}$ receiving antennas. In this radar apparatus, the wireless transmission operation 410 is performed at each transmitting antenna, and the wireless reception operation 420 is performed at each receiving antenna, and the spectrum analysis operation 430 and the Doppler frequency determination operation 440 may be performed at all virtual antennas.

According to one aspect, the transmitting antennas and the receiving antennas are arranged such that the plurality of virtual antennas have the same position. In the wireless transmission operation 410, the radar apparatus transmits an FMCW radar waveform signal through a transmitting antenna array. According to an aspect, at least three peculiar chirps, at least one of which is included in a chirp loop of each of FMCW radar waveform signals transmitted by the plurality of virtual antennas arranged to have the same position, are configured to be respectively positioned in consecutive time slots and have different periods. Here, the expression that three chirps respectively positioned in the consecutive time slots have different periods includes cases in which two out of three have the same period and the remaining one has a different value, or all three have different values.

Figure 6:
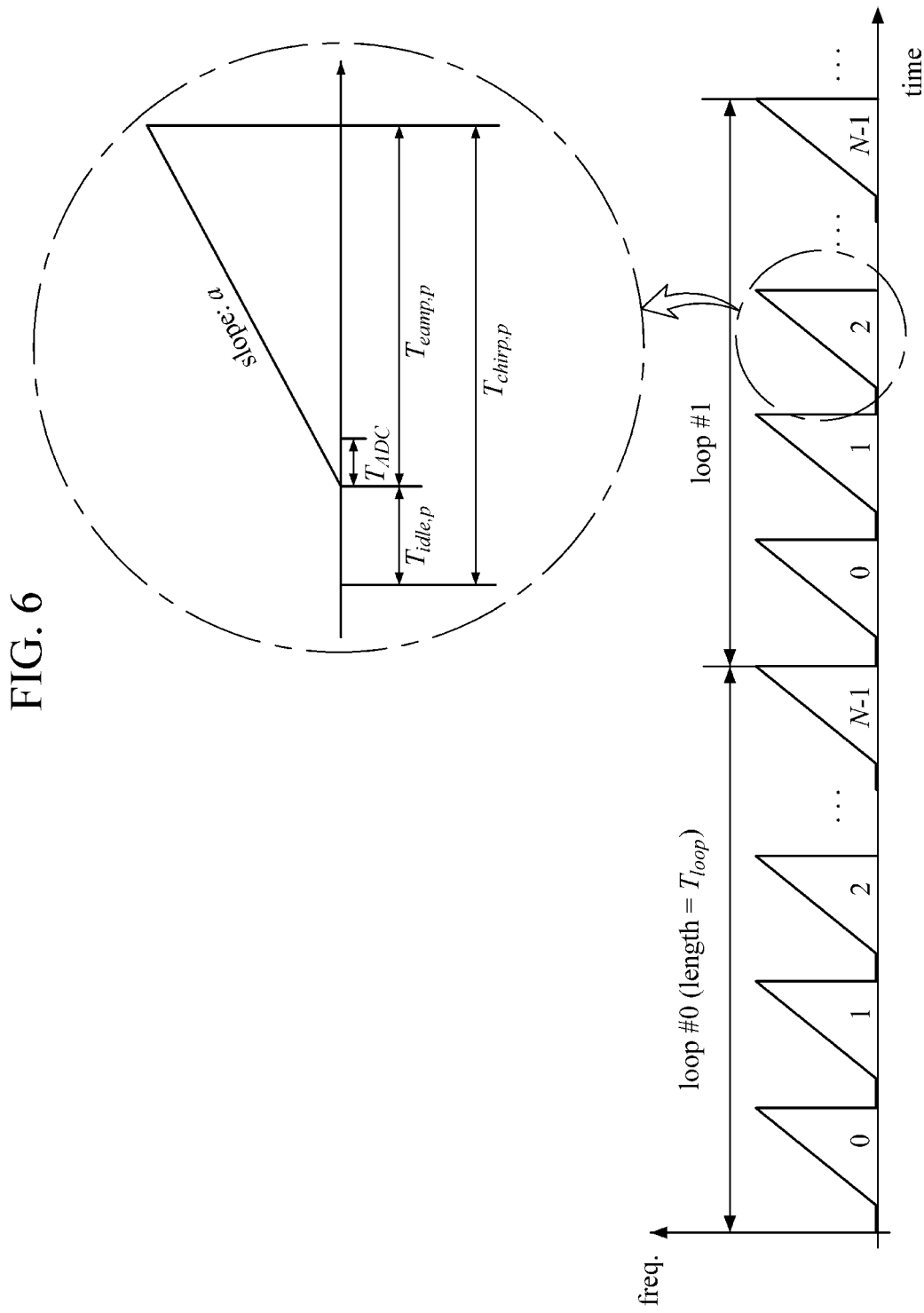
FIG. 6 illustrates a typical frame structure of a radar waveform in the TDM FMCW radar apparatus according to an embodiment.

FIG. 6 illustrates a typical frame structure of a radar waveform in the TDM FMCW radar apparatus according to an embodiment. A frame is a unit of spectrum analysis, and the number of chirp loops included in one frame is expressed herein as $N_{Loop}$. FIG. 6 illustrates only two chirp loops as a part of one frame. In the drawing, $T_{loop}$ is a length of the chirp loop. The length of the chirp loop is the period required for all transmitting antennas to transmit a signal once. Each frame is composed of one or more chirp loops, and each of the chirp loops is composed of one or more chirps. Here, the number of the chirps per chirp loop is expressed as $N_{TX}$. The number of the chirps per chirp loop is generally equal to the number of the transmitting antennas. When a position index of the chirp in the chirp loop is expressed as p, p has a value in a range of $0 <= p <= N_{TX}-1$.

An upper right end of FIG. 6 illustrates a waveform signal of one chirp period of the radar waveform signal. Here, α: frequency sweep rate
$T_{idle,p}$: idle time of pth chirp
$T_{ramp,p}$: length of frequency change section of pth chirp
$T_{chirp,p}$: chirp period of pth chirp ($=T_{idle,p}+T_{ramp,p}$)
$T_{ADC}$: sampling delay that is time difference between time at which transmission of chirp starts and time at which sampling starts
$f_0$: chirp start frequency.

In the proposed invention, the frequency sweep rate a, the chirp start frequency $f_0$, and the sampling delay $T_{ADC}$ are assumed to be the same for all chirps. When a delay component between a transmitting antenna TX (p) used to transmit the pth chirp and a qth receiving antenna is expressed as $T_{TX(0),q}$, a value of $T_{TX(0),q}$ is determined by azimuth and elevation of a target, and a relative position of a virtual antenna specified by TX(p), and q from an antenna reference point in space.

Figure 7:
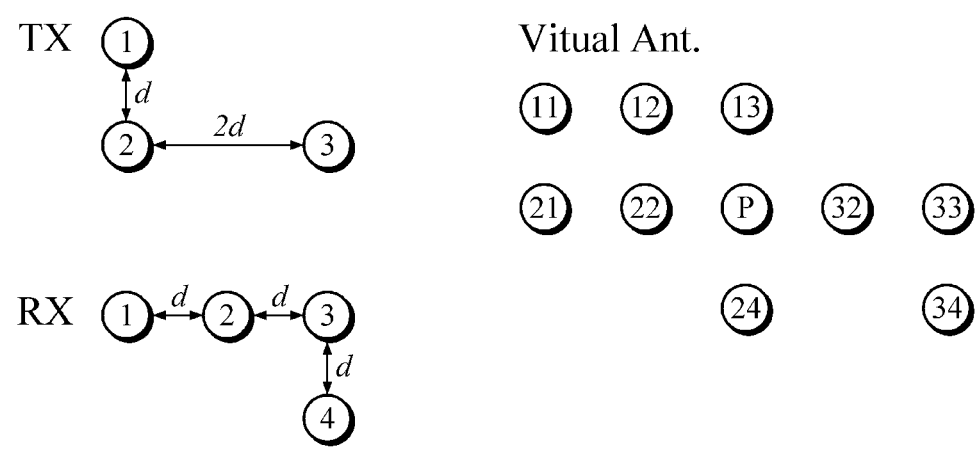
FIG. 7 illustrates an example of an antenna array to which the proposed invention may be applied.

FIG. 7 illustrates an example of an antenna array to which the proposed invention may be applied. When three (TX) transmitting antennas and four (RX) receiving antennas are arranged as illustrated in the drawing, a virtual antenna array Virtual Ant. is illustrated as in the drawing. Each circle represents a position of the virtual antenna and the two digits indicate a transmitting antenna index and a receiving antenna index, respectively. Three virtual antennas generated by a transmitting antenna $TX_1$ and a receiving antenna $RX_4$, a transmitting antenna $TX_2$ and a receiving antenna $RX_3$, and a transmitting antenna $TX_3$ and a receiving antenna $RX_1$ are all generated in the same virtual antenna position P. The proposed invention may be applied to a TDM FMCW radar apparatus having transmitting antennas and receiving antennas arranged such that the plurality of virtual antennas have the same position. According to an aspect, at least three peculiar chirps, at least one of which is included in a chirp loop of each of waveform signals transmitted by the plurality of virtual antennas having the same position, are respectively positioned in consecutive time slots and have different periods. Here, the time slot refers to slots on a time axis distinguished by a chirp count that is sequentially increased in the chirp loop. In addition, the expression that the chirps are respectively positioned in the consecutive time slots means that chirp count values in the chirp loop to which the peculiar chirps belong are sequentially increasing values and does not mean that chirps are adjacent to the same chirp loop or the chirps are transmitted sequentially.

In the case of a MIMO radar apparatus, in general, transmitting antennas sequentially transmit signals and receiving antennas simultaneously receive signals, and thus, in an example of FIG. 7, even though FMCW radar waveform signals are received at virtual antennas with a time difference in the order of the transmitting antenna $TX_1$ and the receiving antenna $RX_4$, the transmitting antenna $TX_2$ and the receiving antenna $RX_3$, and the transmitting antenna $TX_3$ and the receiving antenna $RX_1$, the FMCW radar waveform signals are buffered in a memory, so that when the signals are processed according to the proposed invention, all of the peculiar chirps respectively positioned in consecutive time slots may become available.

According to an aspect, unlike a general waveform signal illustrated in FIG. 6, each of the chirp loops of the FMCW radar waveform signal transmitted by the radar apparatus to which the signal processing method according to an embodiment is applied may include at least $N_{TX}+1$ chirps. As an example, the $N_{TX}$ chirps are valid chirps for estimating a beat frequency and a Doppler frequency, and information that determines the Doppler frequency may be acquired from at least two consecutive chirps from an $N_{TX}$th chirp. However, the proposed invention is not limited thereto, and the consecutive peculiar chirps in the chirp loop may be positioned at a beginning portion or an intermediate portion of the chirp loop.

Figure 8:
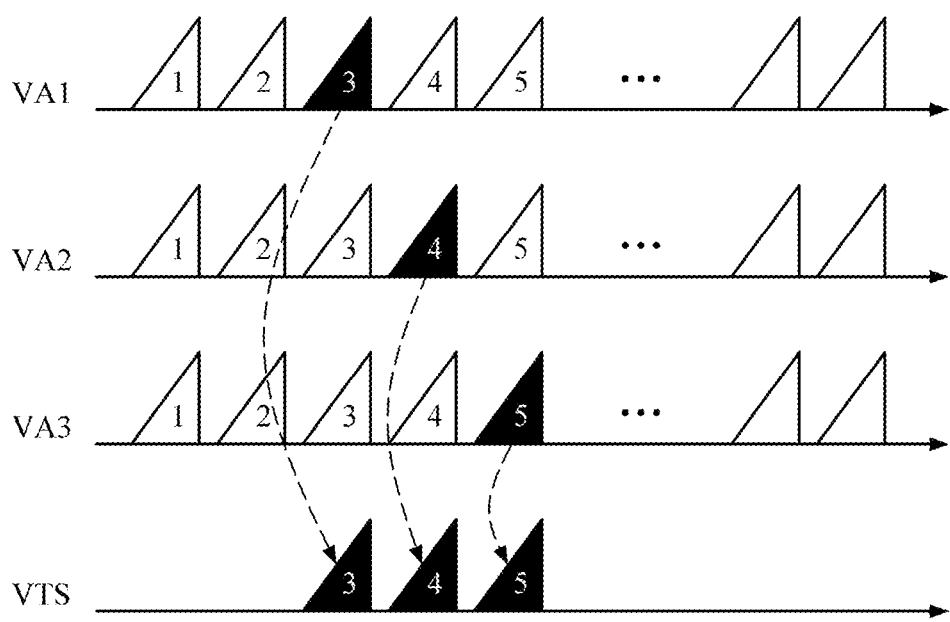
FIG. 8 illustrates an example of peculiar chirps, which are respectively positioned in consecutive time slots, of waveform signals transmitted by virtual antennas.

FIG. 8 illustrates an example of peculiar chirps, which are respectively positioned in consecutive time slots, of waveform signals transmitted by virtual antennas. A peculiar chirp, whose chirp count is three, in a virtual antenna VA1, a peculiar chirp, whose chirp count is four, in a virtual antenna VA2, and a peculiar chirp, whose chirp count is five, in a virtual antenna VA3 are moved onto a virtual time slot VTS. These peculiar chirps have chirp counts in the chirp loop of each radar waveform signal, but have sequential incremental count values when these peculiar chirps gather on the same virtual time slot axis. In this sense, it is expressed herein that peculiar chirps are respectively positioned in "consecutive time slots."

Figure 9:
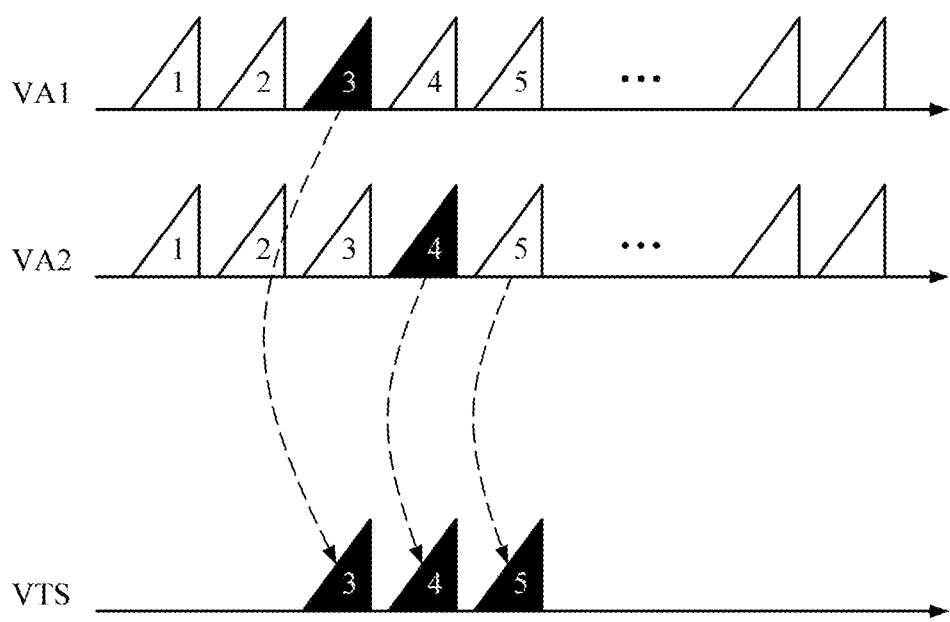
FIG. 9 illustrates another example of peculiar chirps, which are respectively positioned in consecutive time slots, of waveform signals transmitted by virtual antennas.

FIG. 9 illustrates another example of peculiar chirps, which are respectively positioned in consecutive time slots, of waveform signals transmitted by virtual antennas. A peculiar chirp, whose chirp count is three, in a virtual antenna VA1, and peculiar chirps, whose chirp counts are four and five, in a virtual antenna VA2 are moved onto a virtual time slot VTS. The peculiar chirp of "3" and the peculiar chirps of "4 and 5" have chirp counts in the chirp loop of each radar waveform signal, but have sequential incremental count values when these chirps gather on the same virtual time slot axis. In this sense, it is expressed herein that peculiar chirps are respectively positioned in "consecutive time slots."

In the wireless reception operation 420, the radar apparatus receives a FMCW radar waveform signal reflected by the target using the receiving antenna, demodulates a baseband FMCW radar signal, samples a difference signal between the baseband FMCW radar signal and the transmitted signal, and transforms the sampled signal into a digital signal and outputs the same.

In the spectrum analysis operation 430, the radar apparatus determines and outputs a beat frequency and a Doppler frequency from the signal output in the wireless reception operation 420. In one chirp loop, the $N_{TX}$ transmitting antennas sequentially transmit the FMCW radar waveform signal, and each transmitted FMCW radar waveform signal is reflected by the target and received by the $N_{RX}$ receiving antennas. In the spectrum analysis operation 430, a signal processing circuit of the radar apparatus processes the radar waveform signal for each receiving antenna. In addition, the signal processing circuit of the radar apparatus processes the waveform signal in units of chirps in the same time slot in the loops received at one receiving antenna.

In the Doppler frequency determination operation 440, the signal processing circuit of the radar apparatus measures phase differences between at least three peculiar chirps, which are respectively positioned in consecutive time slots and have different periods, received at the plurality of virtual antennas and determines and outputs a true Doppler frequency from measured values and the Doppler frequency output in the spectrum analysis operation. This will be described in detail below.

Description of Claim 2 of Invention

According to an additional aspect of the proposed invention, at least three peculiar chirps, which are respectively positioned in consecutive time slots and have different periods, are configured to differ in at least one of an idle time between the peculiar chirps or a ramp time of the peculiar chirps. Accordingly, since a phase component generated due to a Doppler frequency fa in the signal received from the virtual antenna at the same position may be observed at different time intervals, more information may be obtained. Referring to an exemplary waveform in a dotted-line circle of FIG. 6, the idle time between the chirps corresponds to $T_{idle}$, and the ramp time of the chirp corresponds to $T_{ramp}$. In the example illustrated in the drawing, a period of the chirp may be expressed as $T_{chirp}=T_{idle}+T_{ramp}$.

According to the proposed invention, in the three peculiar chirps present in the virtual antennas, based on the receiving time, the first peculiar chirp may be configured to differ in ramp time, the last (third) peculiar chirp may be configured to differ in idle time, and the intermediate (second) peculiar chirp may be configured to differ in both ramp time and idle time. In the case of employing three or more consecutive peculiar chirps, intermediate chirps in time may all be configured to differ in both ramp time and idle time.

Similar to that described above, in the illustrated embodiment, in the FMCW radar waveform signal, positions of the peculiar chirps that differ in idle time or ramp time, that is, positions on a common time slot axis, may be the beginning, intermediate, or end of each chirp loop, and the position or content may be different for each wireless transmitter. In the example illustrated in FIG. 8 or 9, the peculiar chirps are positioned in the middle on a common time slot axis VTS. As will be described below, it is possible to obtain additional information enabling a true Doppler frequency to be determined from among a plurality of Doppler frequencies, which are generated by an aliasing phenomenon, by varying any one of an idle time $T_{idle}$ between the peculiar chirps and a ramp time $T_{ramp}$ Of the peculiar chirp.

Figure 5:
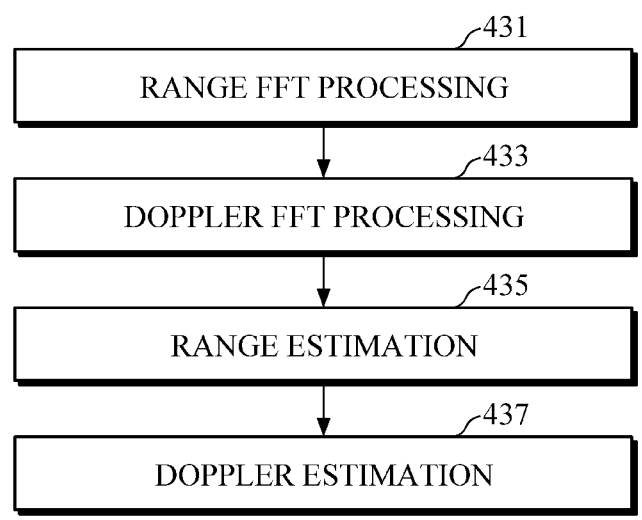
FIG. 5 is a flowchart illustrating a configuration of a spectrum analysis operation according to an embodiment.

Description of Spectrum Analysis of Claim 4 and FIG. 5

FIG. 5 is a flowchart illustrating a configuration of a spectrum analysis operation according to an embodiment. As illustrated in the drawing, in an embodiment, the spectrum analysis operation may include a range FFT processing operation 431, a Doppler fast Fourier transform (FFT) processing operation 433, a range estimation operation 435, and a Doppler estimation operation 437.

In the range FFT processing operation 431, the signal processing circuit of the radar apparatus transforms the digital signal output in the wireless reception operation 420 into a frequency-domain signal in units of chirps and outputs the same. Although an FFT transform is selected as an example in the illustrated embodiment, it is understood that the proposed invention encompasses various known transforms for frequency-domain transformation.

In the Doppler FFT processing operation 433, the signal processing circuit of the radar apparatus transforms the same frequency components of the frequency-domain signal output in the range FFT processing operation 431 into a frequency-domain signal again and outputs the same. In the Doppler FFT processing operation 433, the signal processing circuit of the radar apparatus performs inter-chirp processing by performing FFT after collecting FFT coefficients by frequency, that is, by an FFT index, The transformed FFT coefficients are stored in a memory. The values stored in the memory are range-Doppler spectrum values obtained through a range FFT and a Doppler FFT.

In the range estimation operation 435, the signal processing circuit of the radar apparatus determines and outputs a beat frequency from the signal output in the range FFT processing operation 431. In the range estimation operation 435, the signal processing circuit of the radar apparatus may search for a position of a peak in the spectrum output in the range FFT processing operation 431, that is, an index storing a maximum value, to identify a beat frequency, and calculate a range to the target using the beat frequency.

In the Doppler estimation operation 437, the signal processing circuit of the radar apparatus determines and outputs a Doppler frequency from the signal output and stored in the Doppler FFT processing operation 433. In the Doppler estimation operation 437, the signal processing circuit of the radar apparatus may determine the Doppler frequency by identifying a position of an array that stores a peak value in the range-Doppler spectrum.

Description of Claim 5 of Invention

According to an additional aspect, a true value of the Doppler frequency may be determined from a phase difference between the peculiar chirps measured from at least three peculiar chirp signals respectively positioned in consecutive time slots and having a period different from a measured value. Specifically, a Doppler frequency of the aliased spectrum, at which a theoretically calculated phase difference has the most similar value to the measured phase difference may be determined as a true Doppler frequency.

Due to the aliased spectrum, the true Doppler frequency is spaced apart from the measured Doppler frequency by an integer multiple of a width of the aliased spectrum. The phase difference of the at least three peculiar chirp signals, which are respectively positioned in consecutive time slots and have different periods, is calculated from the Doppler frequency of the aliased spectrum that may be a candidate, and the Doppler frequency whose phase difference is most similar to the actually measured phase difference may be estimated as the true Doppler frequency.

Figure 10:
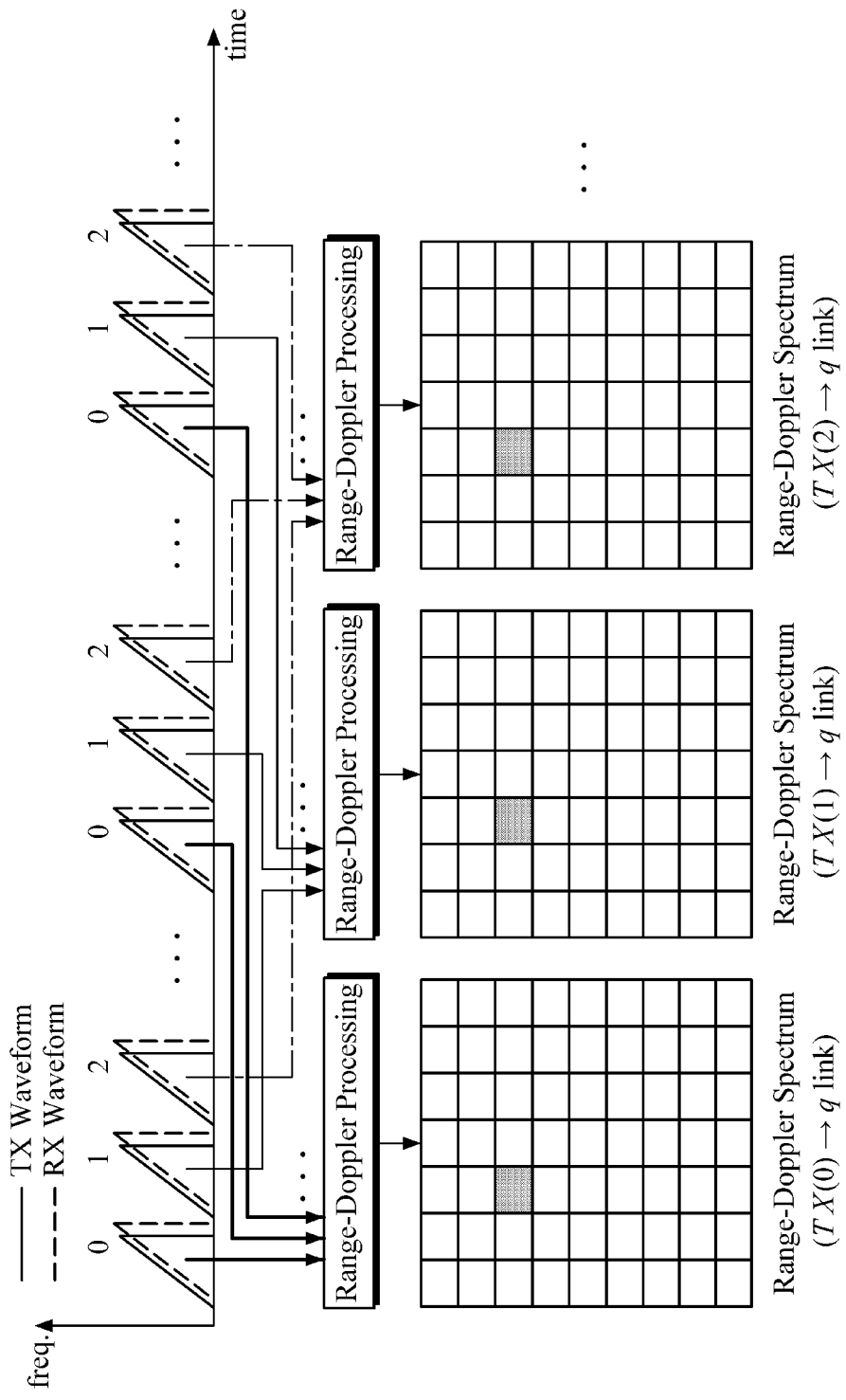
FIG. 10 illustrates a process of obtaining a range-Doppler spectrum by performing range-Doppler processing in a typical TDM FMCW radar apparatus.

Description of FIG. 10

Figure 1:
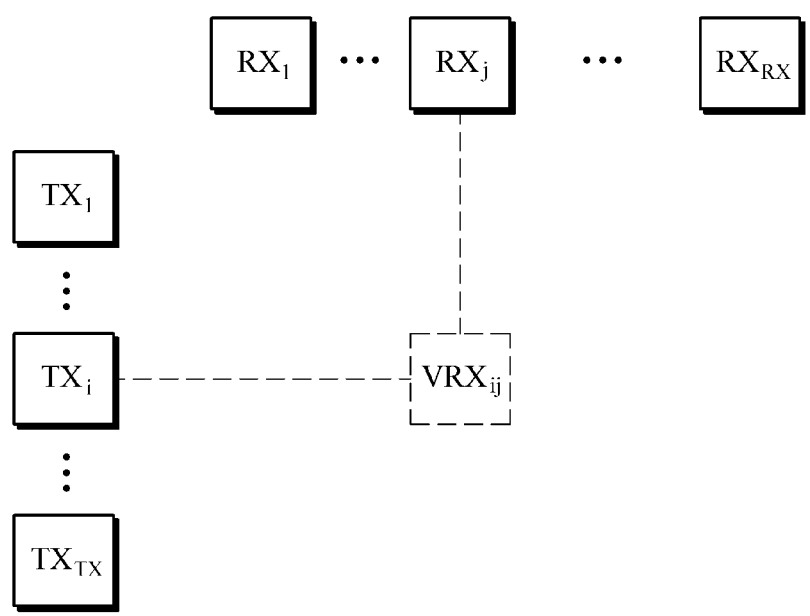
FIG. 1 illustrates an antenna array, which is composed of TX transmitting antennas and RX receiving antennas, in an exemplary frequency modulated continuous wave (FMCW) radar apparatus.
Figure 2:
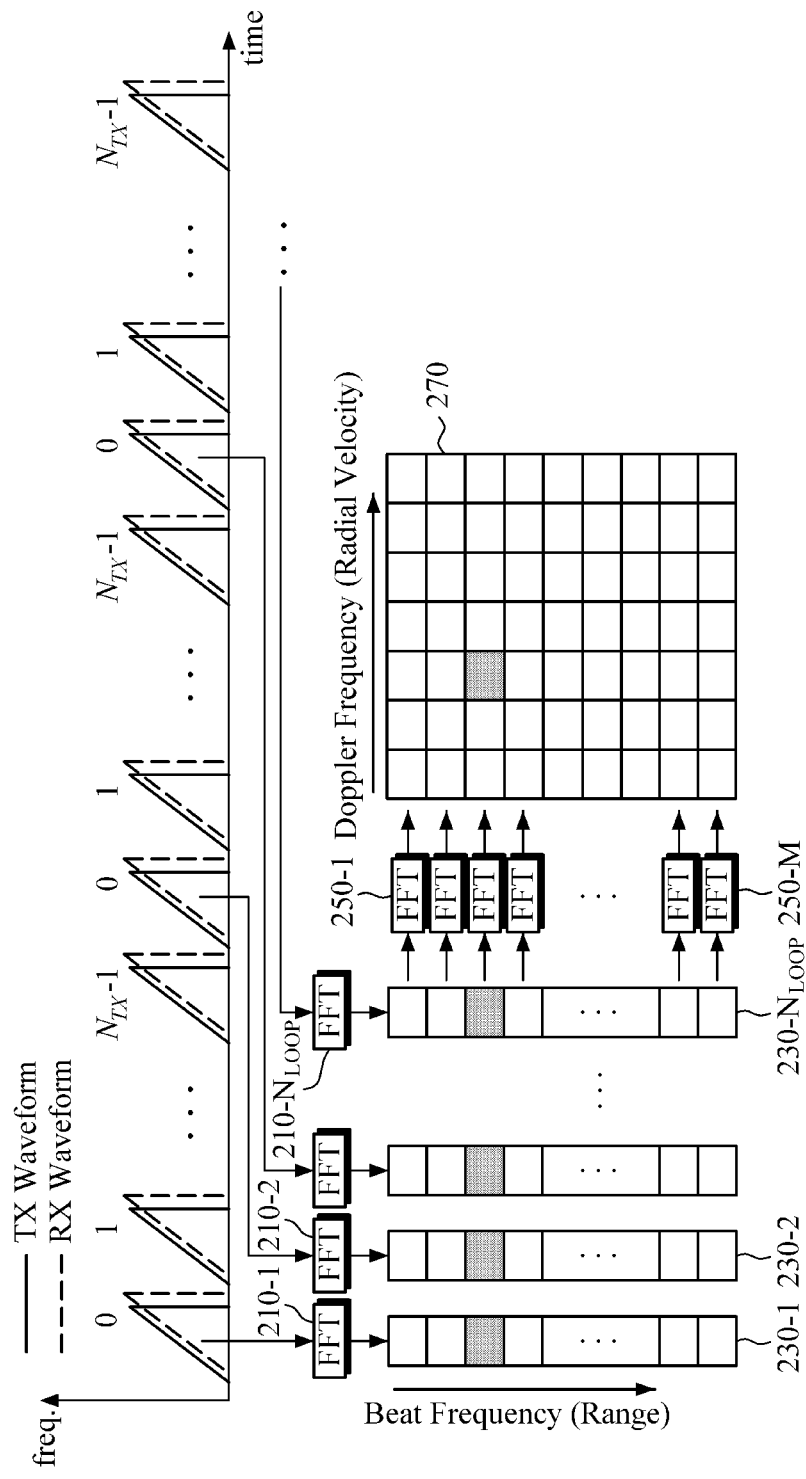
FIG. 2 is a diagram illustrating an example of range-Doppler processing for estimating a range and a radial velocity from a time-division-multiplexed (TDM) FMCW radar signal.

FIG. 10 illustrates a process of obtaining a range-Doppler spectrum by performing range-Doppler processing in a typical TDM FMCW radar apparatus. Even in the proposed invention, range-Doppler processing is performed in a manner similar to that shown in FIG. 2, and a description is made with reference to the qth receiving antenna as an example. When a signal processing procedure as illustrated in FIG. 2 is performed at each receiving channel for all TX (p), a total of Nix range-Doppler spectra may be obtained as shown in FIG. 10. As indicated by gray in FIG. 10, there is a peak in an arrangement corresponding to a range and a radial speed of the target on the range-Doppler spectrum, and a phase value at a peak in the range-Doppler spectrum obtained by a TX (p)→q link, that is, a virtual antenna in which a signal transmitted from a pth transmitting antenna is received by the qth receiving antenna is, ignoring noise, expressed as follows,

[Equation 3]

$$\emptyset_{p,q} = 2\pi(f_0 + \alpha T_{ADC})\tau_{TX(p),q} + 2\pi f_d(\Sigma_{i=0}^{p-1} T_{chirp,i} + T_{idle,p})$$

α: frequency sweep rate
α: frequency sweep rate
$T_{idle,p}$: idle time of pth chirp
$T_{ramp,p}$: length of frequency change section of pth chirp
$T_{chirp,p}$: chirp period of pth chirp ($=T_{idle,p}+T_{ramp,p}$)
$T_{ADC}$: sampling delay that is time difference between time at which transmission of chirp starts and time at which sampling starts
$f_0$: chirp start frequency.

Here, when α, $f_0$, and $T_{ADC}$ are identical for all virtual antennas, and, for signals p, p+1, and p+2 received in the three consecutive chirps,
a relationship of $T_{TX(p),q}=T_{TX(p+1),q}=T_{TX(p+2),q}$ is satisfied, (where, $T_{TX(p),q}$ indicates a delay component between the transmitting antenna TX(p) and the qth receiving antenna used to transmit the pth chirp)
phase differences between consecutive chirps may be expressed as follows, $$\Delta\emptyset_{1,0} = \qquad \text{[Equation 4]}$$

$$\emptyset_{p+1,q1} - \emptyset_{p,q0} = 2\pi f_d(T_{ramp,p} + T_{idle,p+1}) + \frac{T_{idle,p+2} - T_{idle,p+1}}{\Delta T_{idle}}$$

-continued $$\Delta\emptyset_{2,1} = \emptyset_{p+2,q2} - \emptyset_{p+1,q1} = 2\pi f_d(T_{ramp,p+1} + T_{idle,p+2})$$

$$\Delta\emptyset_{2,1,0} = \Delta\emptyset_{2,1} - \Delta\emptyset_{1,0} = 2\pi f_d\left(\frac{T_{ramp,p+1} - T_{ramp,p}}{\Delta T_{ramp}} + \frac{T_{idle,p+2} - T_{idle,p+1}}{\Delta T_{idle}}\right).$$

The above case is a case in which all the chirps are received at one virtual antenna that has received the radar waveform signal transmitted from the same transmitting antenna. In another case, even when three chirps, which are included in chirp loops transmitted by the plurality of virtual antennas having the same position and respectively positioned in consecutive time slots, satisfy the following conditional expression, phase differences may be equally expressed by [Equation 4].

$$T_{TX(p),q0} = T_{TX(p+1),q1} = T_{TX(p+2),q2}$$

Here, pth, (p+1)th, and (p+2)th chirps respectively transmitted from different transmitting antennas $TX_0$, $TX_1$, and $TX_2$ are respectively received at different receiving antennas q0, q1 and q2. In this case, the virtual antenna generated by the transmitting antenna TX0 and the receiving antenna q0, the virtual antenna generated by the transmitting antenna TX1 and the receiving antenna q1, and the virtual antenna generated by the transmitting antenna TX2 and the receiving antenna q2 are present by overlapping in the same position.

As another example, even when the following conditional expression is satisfied, phase differences may be equally expressed by [Equation 4].

$$T_{TX(p),q0} = T_{TX(p+1),q1} = T_{TX(p+2),q1}$$

Here, the pth chirp transmitted from the different transmitting antenna TX0 is received at the receiving antenna q0, and the (p+1)th chirp and the (p+2)th chirp transmitted from the transmitting antenna TX1 are received at another receiving antenna q1. In this case, the virtual antenna generated by the transmitting antenna TX0 and the receiving antenna q0, and the virtual antenna generated by the transmitting antenna TX1 and the receiving antenna q1 are present by overlapping in the same position.

To generalize this, it can be seen that, in an antenna array in which transmitting antennas and receiving antennas are arranged so that a plurality of virtual antennas have the same position, when at least three consecutive peculiar chirps, at least one thereof is included in a chirp loop of each of radar signals transmitted by the plurality of virtual antennas, are respectively positioned in consecutive time slots, phase differences between the at least three consecutive peculiar chirps may be expressed by [Equation 4].

It can be seen from Equation 4 that the phase differences between the chirps respectively positioned in the consecutive time slots are determined by an idle time $T_{idle}$ and a ramp Time $T_{ramp}$. When all the chirps have the same idle time and ramp time as in the conventional TDM FMCW system, information obtainable from the phase differences between the chirps is limited to $2\pi f_d(T_{ramp}+T_{idle})$.

As illustrated in FIG. 10, in the Doppler processing at the receiving channel of each virtual antenna, signals received from the same transmitting antenna are input, and a time difference between the input samples is $T_{loop}$. When a Doppler frequency due to a movement of the target is expressed as $f_d$, the minimum phase difference that may be observed by performing the Doppler processing is $2\pi f_d T_{loop}$.

Figure 3:
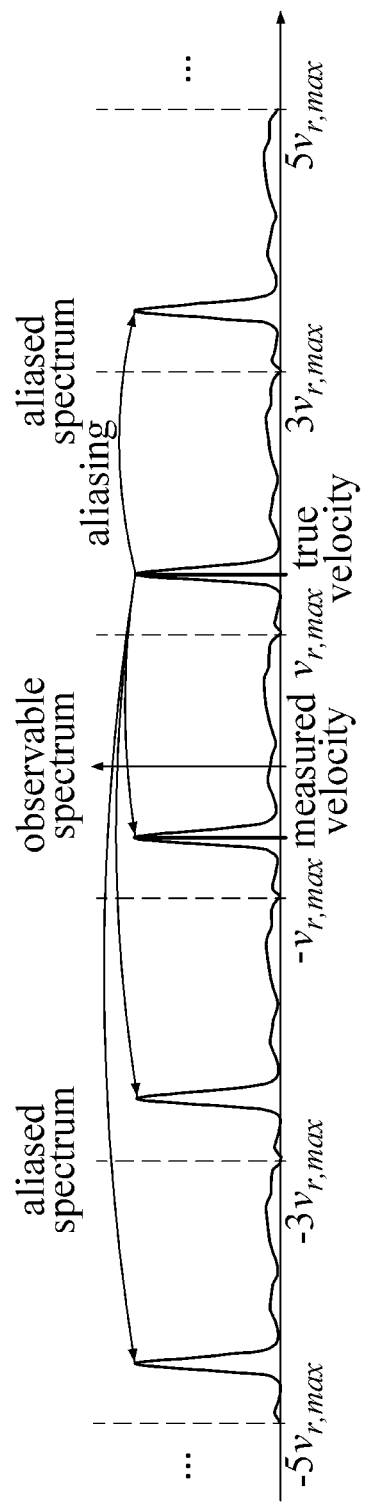
FIG. 3 illustrates velocity spectra that may be estimated from a Doppler fast Fourier transform (FFT) output spectrum.

At this point, the maximum Doppler frequency measurable by Equation 1 may be expressed as $f_{d,max}=1/(2T_{loop})$, and in a case of $f_d > |f_{d,max}|$, an error occurs in a radial speed estimation value due to an aliasing phenomenon as illustrated in FIG. 3. When the Doppler frequency estimated on the range-Doppler spectrum is expressed as $f_{d,measured}$, and an actual Doppler frequency is expressed as $f_{d,true}$, $f_{d,true}$ and $f_{d,measured}$ have a relationship as follows, $$f_{d,true} = f_{d,measured} + 2k f_{d,max} \quad \text{[Equation 5]}$$

In Equation 5, k is an arbitrary integer and k is estimated to determine the actual Doppler frequency $f_{d,true}$.

Figure 11:
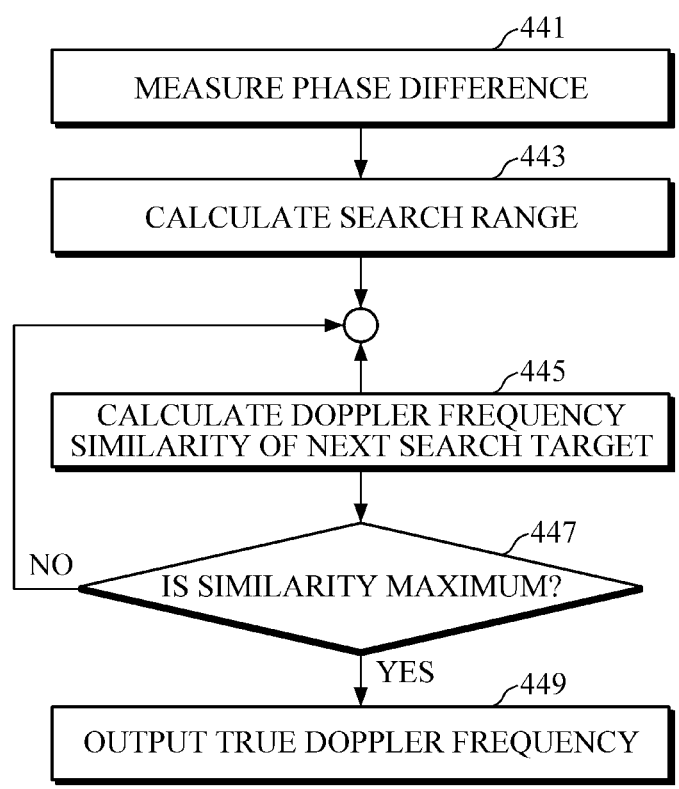
FIG. 11 is a flowchart illustrating a configuration of a Doppler frequency determination operation according to an embodiment.

FIG. 11 is a flowchart illustrating a configuration of a Doppler frequency determination operation according to an embodiment. As illustrated in the drawing, the Doppler frequency determination operation according to an embodiment may include a phase difference measurement operation 441, a search range calculation operation 443, and Doppler-frequencies-with-maximum-similarity search operations 445, 447, and 449.

In the phase difference measurement operation 441, the signal processing circuit of the radar apparatus measures a phase difference between at least three chirp signals respectively positioned in consecutive time slots and having different periods. These chirp signals may be signals extracted from the chirp loops received from different virtual antennas, and some thereof may be signals extracted from the chirp loops received from the same virtual antenna. These phase difference values may be measured by detecting a start point and an end point of each chirp and measuring a time difference between the end points of the consecutive chirps. A measurement vector as shown below may be generated from the measured phase differences by using the phase differences between the chirps obtained in Equation 4, $$X = \begin{bmatrix} \exp(j\Delta\phi_{1,0}) \\ \exp(j\Delta\phi_{2,1}) \\ \exp(j\Delta\phi_{2,1,0}) \end{bmatrix}. \quad \text{[Equation 6]}$$

In the search range calculation operation 443, the signal processing circuit of the radar apparatus determines a search range of the Doppler frequency of the aliased spectrum by a ratio of a maximum Doppler frequency of the target to be detected and a maximum Doppler frequency obtained from the range-Doppler spectrum.

In Equation 5, a value of k may be referred to as an index of the Doppler frequencies present on the aliased spectrum. There are countless aliased spectra, and thus, appropriately limiting the range thereof is important in terms of the possibility that the proposed invention may be actually applied.

When a start frequency of the FMCW waveform is defined as $f_0$ and the maximum moving velocity of the target is defined as $v_{r,max,target}$, the maximum Doppler frequency of the target may be expressed as follows, $$f_{d,max,target} = \frac{2 v_{r,max,target}}{c} f_0, \quad \text{[Equation 7]}$$

(where, c is a wave velocity).

It can be seen from Equation 4 that a minimum measurable time difference is $\Delta T_{ramp} + \Delta T_{idle}$. Thus, when $\Delta T_{ramp} + \Delta T_{idle}$ instead of $T_{loop}$ is substituted in a conditional expression of Equation 1, and Equation 7 is substituted for $f_d$ of Equation 1, which are then rearranged, the following relational expression may be derived, $$\Delta T_{ramp} + \Delta T_{idle} < \frac{c}{4 f_0 v_{r,max,target}}. \quad \text{[Equation 8]}$$

As shown in Equation 8, in the proposed invention, at least three chirps respectively positioned in consecutive time slots are configured such that the sum of $\Delta T_{ramp}$ and $\Delta T_{idle}$, that is, an inter-chirp difference value of the idle time and an inter-chirp difference value of the ramp time, is limited by an aimed maximum detection rate of the target. Thus, using the maximum detection rate determined by the system design requirements, one or both of $\Delta T_{ramp}$ and $\Delta T_{idle}$ are appropriately adjusted to satisfy the relationship of Equation 8.

As shown in FIG. 3 and Equation 5, a peak due to the aliasing phenomenon occurs at intervals of $2f_{d,max}$ on the Doppler spectrum. Thus, an integer, which is greater than or equal to a ratio of Equations 7 and $2f_{d,max}$ but is smallest, is determined as the maximum value of k.

$$k_{MAX} = \left\lceil \frac{f_{d,max,target}}{2 f_{d,max}} \right\rceil \quad \text{[Equation 9]}$$

where, $2f_{d,max,target}$ is the maximum Doppler frequency to be detected, and $2f_{d,max}$ is the maximum Doppler frequency that may be measured through the Doppler processing, that is, a Doppler FFT. That is, k that maximizes Re $\{w(k)^H x\}$ is identified while changing k from $-k_{MAX}$ to $k_{MAX}$ within a range of $2f_{d,max}$, target from a Doppler frequency of $2f_{d,measured}$, which is primarily measured through the Doppler processing.

In the Doppler-frequencies-with-maximum-similarity search operations 445, 447, and 449, the signal processing circuit of the radar apparatus determines and outputs the Doppler frequency, at which a theoretically calculated phase difference is most similar to the measured phase difference, from among the Doppler frequencies of the aliased spectrum.

First, at a search target Doppler frequency, a phase difference between at least three chirp signals, which are respectively positioned in consecutive time slots and have different periods, included in the chirp loop is theoretically calculated, and a similarity value between the theoretically calculated value and the measured value measured in the phase difference measurement operation 441 is calculated (operation 445). For all the Doppler frequencies, which are included in the aliased spectrum, within the search range, the Doppler frequency with the maximum value among the calculated similarity values is retrieved (447), and the retrieved Doppler frequency is output as the true Doppler frequency (449).

In order to compare the measured value with the theoretically calculated result, the theoretical value is defined as follows by using Equations 4 and 5, $$W(k) = \begin{bmatrix} \exp(j2\pi f_{d,measured} + 2k|f_{d,max}|)(T_{ramp,p} + T_{idle,p+1})) \\ \exp(j2\pi f_{d,measured} + 2k|f_{d,max}|)(T_{ramp,p+1} + T_{idle,p+2})) \\ \exp(j2\pi f_{d,measured} + 2k|f_{d,max}|)(T_{ramp} + T_{idle})) \end{bmatrix}.$$

Since k, which has the highest degree of similarity between the theoretical value of Equation 10 and the measured value of Equation 6, is the solution, k that maximizes Re$\{w(k)^H x\}$ is identified by changing k within an appropriate range, and the actual Doppler frequency is calculated by substituting the estimation result into Equation 5. Here, H is a Hermitian operator. Thereafter, from the Doppler frequency, a radial speed of the target is calculated using a relationship of $v_{r,true} = \lambda f_{d,true}/2$.

Description of Invention of Apparatus

Description of Claim 7 of Invention

Figure 12:
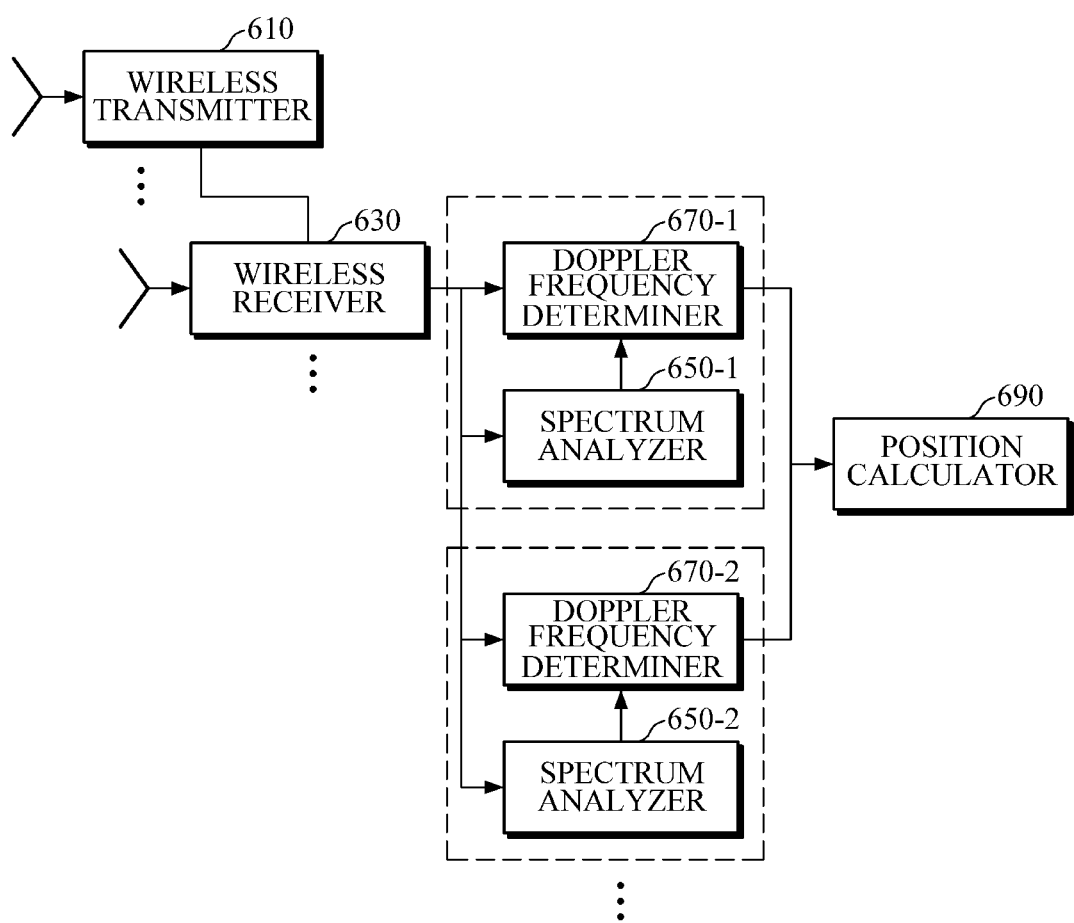
FIG. 12 is a block diagram illustrating a configuration of the TDM FMCW radar apparatus according to an embodiment.

FIG. 12 is a block diagram illustrating a configuration of the TDM FMCW radar apparatus according to an embodiment. As illustrated in the drawing, the TDM FMCW radar apparatus according to an embodiment includes a wireless transmitter 610, a wireless receiver 630, a spectrum analyzer 650, and a Doppler frequency determiner 670. In the illustrated embodiment, $N_{TX}$ wireless transmitters, $N_{RX}$ wireless receivers, and $N_{TX}*N_{RX}$ spectrum analyzers are included. That is, since the spectrum analyzer must be provided for each virtual antenna, the $N_{TX}$ spectrum analyzers are connected to each wireless receiver. However, for simplicity of illustration, only one wireless transmitter 610, one wireless receiver 630, two spectrum analyzers 650-1 and 650-2, and two Doppler frequency determiners 670-1 and 670-2 are specified in the drawings.

According to an aspect, the transmitting antennas and the receiving antennas are arranged such that the plurality of virtual antennas have the same position. The wireless transmitter 610 transmits an FMCW radar waveform signal through a transmitting antenna. According to an aspect, in the FMCW radar waveform signals transmitted by the wireless transmitter 610 using transmitting antennas constituting the plurality of virtual antennas having the same position, each chirp loop has at least one peculiar chirp, and there are at least three peculiar chirps. These peculiar chirps are respectively positioned in consecutive time slots when viewed on a common time slot axis, and the at least three peculiar chirps have different periods. Here, the expression that three peculiar chirps respectively positioned in the consecutive time slots have different periods includes cases in which two out of three have the same period and the remaining one has a different value, or all three have different values.

The wireless receiver 630 receives FMCW radar waveform signals reflected by the target using the receiving antenna, demodulates baseband FMCW radar signals, samples a difference signal between the baseband FMCW radar signal and the transmitted signal, and transforms the sampled signal into a digital signal and outputs the same. The transmitting antennas and the receiving antennas are generally linearly arranged at equal intervals, but may also be non-linearly arranged at non-uniform intervals.

The spectrum analyzer 650 determines and outputs beat frequencies and Doppler frequencies from the signal output from the wireless receiver 630. In one chirp loop, the $N_{TX}$ transmitting antennas sequentially transmit the FMCW radar waveform signal, and each transmitted FMCW radar waveform signal is reflected by the target and received by the $N_{RX}$ wireless receivers. Each spectrum analyzer 650 processes the chirps of a period corresponding to the wireless transmitter 610 allocated thereto among the chirps output from the wireless receiver 630. For example, the spectrum analyzer 650-1 may be allocated to process first chirps of the $N_{TX}$ chirps that are repeated for each chirp loop, and the spectrum analyzer 650-2 may be allocated to process second chirps of the $N_{TX}$ chirps that are repeated for each chirp loop.

The Doppler frequency determiner 670 measures a phase difference between at least three chirps, which are respectively positioned in consecutive time slots and have different periods, received from the wireless receiver 630 and determines and outputs a true Doppler frequency value from the measured values and the Doppler frequency output in the spectrum analysis operation. This will be described in detail below.

Description of Claim 8 of Invention

In an additional aspect of the proposed invention, the at least three chirps respectively positioned in the consecutive time slots are configured to differ in at least one of an idle time between the chirps or a ramp time of the chirp. Accordingly, phase components generated due to a Doppler frequency fa may be observed at different time intervals so that more information may be obtained. Referring to an exemplary waveform in a dotted-line circle of FIG. 6, the idle time between the chirps corresponds to $T_{idle}$, and the ramp time of the chirp corresponds to $T_{ramp}$. In the example illustrated in the drawing, a period of the chirp may be expressed as $T_{chirp} = T_{idle} + T_{ramp}$.

According to the proposed invention, in the at least three chirps respectively positioned in consecutive time slots and having different periods, a first chirp may be configured to differ in ramp time, a last chirp may be configured to differ in idle time, and an intermediate chirp may be configured to differ in both ramp time and idle time. In the case of employing three or more chirps respectively positioned in consecutive time slots and having different periods, intermediate chirps may be configured to differ in both ramp time and idle time.

Similar to that described above, in the illustrated embodiment, in the FMCW radar waveform signal, positions of the chirps, which differ in idle time or ramp time, may be the beginning, middle, or end of the loop, and the position or content may be different for each wireless transmitter. As will be described below, it is possible to obtain additional information enabling a true Doppler frequency to be determined from among a plurality of Doppler frequencies, which are generated by an aliasing phenomenon, by varying an idle time $T_{idle}$ between the chirps and a ramp time $T_{ramp}$ of the chirp.

Description of Claim 10 of Invention

Figure 13:
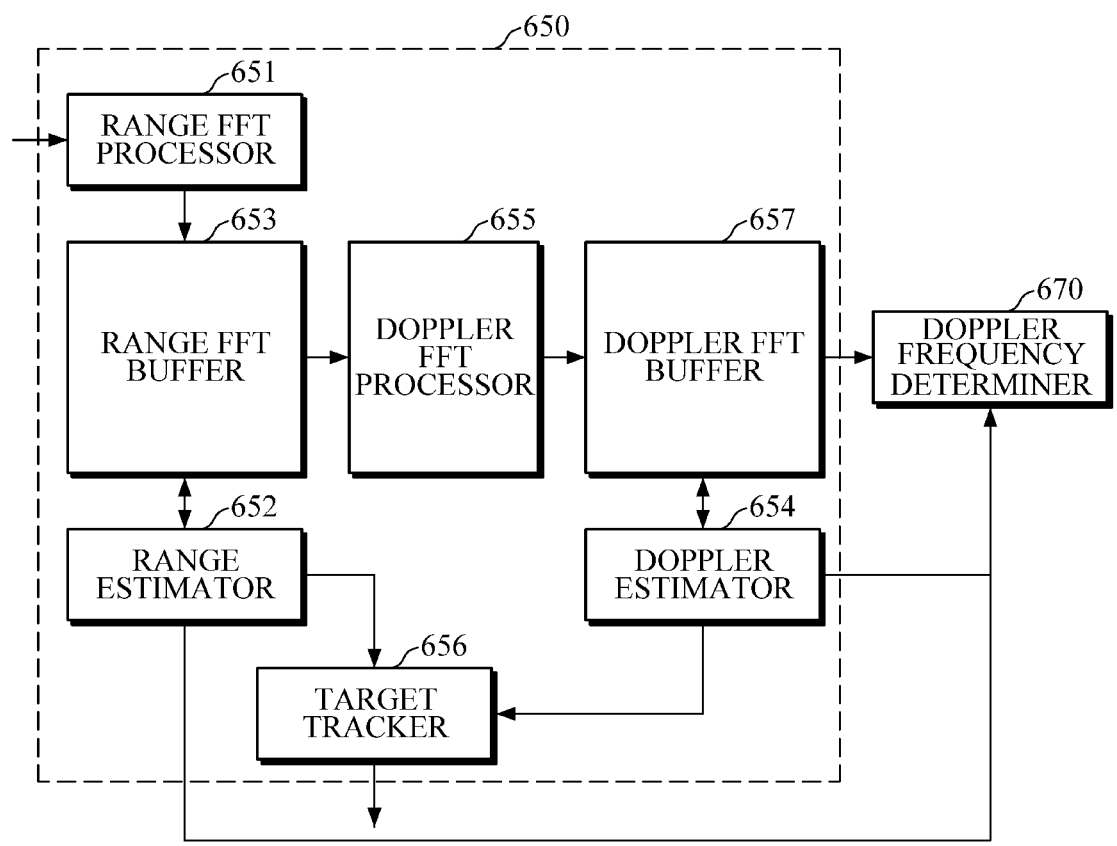
FIG. 13 is a block diagram of a configuration of a spectrum analyzer according to an embodiment.

FIG. 13 is a block diagram of a configuration of a spectrum analyzer according to an embodiment. As illustrated in the drawing, in an embodiment the spectrum analyzer 650 includes a range FFT processor 651, a range estimator 652, a Doppler FFT processor 655, and a Doppler estimator 654.

The range FFT processor 651 transforms the digital signal output from the wireless receiver 630 into a frequency-domain signal in units of chirps and outputs the same. Although an FFT transform is selected as an example in the illustrated embodiment, it is understood that the proposed invention encompasses various known transforms for frequency-domain transformation. The range FFT processor 651 performs FFT transform on a beat frequency signal of the chirp transmitted by the antenna allocated thereto among the chirps, which are present in a first chirp loop of the digital signal output by the wireless receiver 630 connected thereto, and stores the transformed signal in a range FFT buffer 653, and performs FFT transformation on a beat frequency signal of the chirp, which is transmitted by the same antenna, in the next chirp loop and stores the transformed signal in the range FFT buffer 653. Thus, in the illustrated embodiment, the range FFT processor 651 processes the FFT transformation as many times as the number of the chirp loops, that is, $N_{Loop}$ times, and the range FFT buffer 653 has a size capable of storing at least $N_{Loop}$ FFT coefficient sets.

Although an example in which $N_{Loop}$ range FFT processors 210 are present is illustrated in FIG. 2, the embodiment illustrated in FIG. 10 adopts a structure in which one range FFT processor 651 is provided for each virtual antenna, and performs FFT transform on the beat frequency signal from the signal, which is received by the receiving antenna, for each chirp loop, and outputs a result and the result is accumulated and stored in the range FFT buffer 653. Accordingly, the range FFT processor 651 should have a speed at which a single Fourier operation may be fully processed within a period of at least one chirp loop.

The range estimator 652 determines and outputs a beat frequency from the signal output from the range FFT processor 651. The range estimator 652 may search for a position of a peak, that is, an index storing the maximum value in the spectrum stored in the range FFT buffer 653 to identify the beat frequency, and calculate a range to the target from the beat frequency.

The Doppler FFT processor 655 transforms the same frequency components of the frequency-domain signal output from the range FFT processor 651 into a frequency-domain signal again and outputs the same. The Doppler FFT processor 655 performs inter-chirp processing by performing FFT transformation by collecting FFT coefficients, which are stored in the range FFT buffer 653, by frequency, that is, by an FFT index. The transformed FFT coefficients are stored in a Doppler FFT buffer 657.

In one embodiment, the Doppler FFT processor 655 includes as many FFT transformers as the number of Fourier coefficients stored in the range FFT buffer 653. As another example, a structure of repeatedly executing one Fourier transform may be employed.

The Doppler FFT processor 655 receives $N_{Loop}$ output coefficients of the same frequency corresponding to the number $N_{Loop}$ of the chirp loops and performs FFT transformation on the output coefficients and stores the transformed output coefficients in the Doppler FFT buffer 657. The values stored in the Doppler FFT buffer 657 are range-Doppler spectrum values obtained through a range FFT and a Doppler FFT.

The Doppler estimator 654 determines and outputs a Doppler frequency from the signal output from the Doppler FFT processor 655. The Doppler estimator 654 may determine the Doppler frequency by identifying a position of an array that stores a peak value from the range-Doppler spectrum stored in the Doppler FFT buffer 657

According to an additional aspect, a true value of the Doppler frequency may be determined from a phase difference between the chirps measured from at least three chirp signals respectively positioned in consecutive time slots and having a period different from a measured value. Specifically, a Doppler frequency of the aliased spectrum, at which a theoretically calculated phase difference has the most similar value to the measured phase difference may be determined as a true Doppler frequency.

The Doppler frequency determiner 670 measures a phase difference between chirps from at least three chirp signals, which are respectively positioned in consecutive time slots, output from the wireless receiver 630 as shown in FIG. 6, receives the plurality of Doppler frequencies calculated by the Doppler estimator 654, and determines and outputs the Doppler frequency, at which the measured phase difference is closest to the theoretically calculated value, as a true value from among the plurality of Doppler frequencies. Since these operations have been previously described with reference to FIG. 11, detailed descriptions thereof will be omitted.

Figure 14:
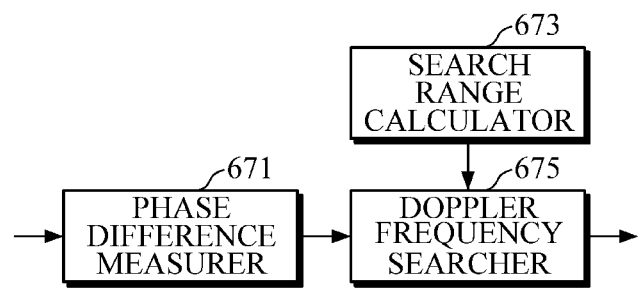
FIG. 14 is a block diagram illustrating a configuration of a Doppler frequency determiner according to an embodiment.

FIG. 14 is a block diagram illustrating a configuration of the Doppler frequency determiner according to an embodiment. As illustrated in the drawing, the Doppler frequency determiner includes a phase difference measurer 671, a search range calculator 673, and a Doppler frequency searcher 675.

The phase difference measurer 671 measures the phase difference expressed by Equation 4, that is, the phase difference between the at least three chirps respectively positioned in consecutive time slots. These phase difference values may be measured by detecting a start point and an end point of each of the chirps and measuring a time difference between the end points respectively positioned in consecutive time slots.

The search range calculator 673 determines a search range of the Doppler frequency of the aliased spectrum by a ratio of the maximum Doppler frequency of the target to be detected and the maximum Doppler frequency obtained from the range-Doppler spectrum.

The Doppler frequency searcher 675 determines and outputs the Doppler frequency, at which a theoretically calculated phase difference value is most similar to a measured phase difference value, from among the Doppler frequencies of the aliased spectrum corresponding to the search range calculated by the search range calculator 673.

First, at a search target Doppler frequency, a phase difference between at least three chirp signals, which are respectively positioned in consecutive time slots and have different periods, included in the chirp loop is theoretically calculated, and a similarity value between the theoretically calculated value and the measured value measured by the phase difference measurer 671 is calculated. For all the Doppler frequencies, which are included in the aliased spectrum, within the search range, the Doppler frequency with the maximum value among the calculated similarity values is retrieved, and is output as the true Doppler frequency.

The operation of the configuration of FIG. 14 has been described in the method invention described with reference to FIG. 11, and thus detailed description thereof will be omitted.

According to the proposed invention, it is possible to overcome the existing limit of a detectable radial velocity of a target in a TDM FMCW radar apparatus. Furthermore, according to the proposed invention, it is possible to increase position resolution by increasing the number of transmitting antennas in a TDM FMCW radar apparatus. Furthermore, it is possible to solve a Doppler ambiguity problem while minimizing constraints in antenna design or minimizing an increase in frame length in a TDM FMCW radar apparatus. Alternatively, according to the proposed invention, it is possible to solve a Doppler ambiguity problem while minimizing constraints in antenna design and minimizing an increase in frame length in a TDM FMCW radar apparatus.

The present invention has been described above with reference to the embodiments referring to the accompanying drawings, but is not limited thereto. Rather, the present invention should be construed as encompassing various modifications that may be apparent to those skilled in the art. The appended claims are intended to cover such modifications.

What is claimed is:

1. A signal processing method of a time-division-multiplexed (TDM) frequency modulated continuous wave (FMCW) radar apparatus having an antenna array in which transmitting antennas and receiving antennas are arranged such that a plurality of virtual antennas have the same position, the method comprising:
a wireless transmission operation of transmitting FMCW radar waveform signals that are configured such that at least three peculiar chirps included in a chirp loop of each of radar signals transmitted by the plurality of virtual antennas having the same position, are respectively positioned in consecutive time slots and have different periods;
a wireless reception operation of demodulating baseband FMCW radar signals from FMCW radar waveform signals reflected by a target, sampling difference signals between the baseband FMCW radar signals and the transmitted signals, transforming the difference signals into digital signals, and outputting the digital signals;
a spectrum analysis operation of determining and outputting beat frequencies and Doppler frequencies from the signals output in the wireless reception operation; and
a Doppler frequency determination operation of measuring phase differences between the at least three peculiar chirps, which are respectively positioned in consecutive time slots, have different periods, and are received at the plurality of virtual antennas in the wireless reception operation, and determining and outputting a true Doppler frequency from the measured values and the Doppler frequencies output in the spectrum analysis operation,
wherein in the Doppler frequency determination operation,
a phase difference between the peculiar chirps is measured from at least three peculiar chirp signals, which are respectively positioned in consecutive time slots and output in the wireless reception operation, and the Doppler frequency, at which theoretically calculated phase difference values are most similar to measured phase difference values, is determined as the true Doppler frequency and output.

2. The method of claim 1, wherein the FMCW radar waveform signals transmitted in the wireless transmission operation are configured such that the at least three peculiar chirps respectively positioned in consecutive time slots differ in at least one of an idle time between the peculiar chirps or a ramp time of the peculiar chirps.

3. The method of claim 2, wherein the at least three chirps respectively positioned in consecutive time slots are configured such that a sum of an inter-peculiar chirp difference value of the idle time and an inter-peculiar chirp difference value of the ramp time is limited by a desired target maximum detection rate of the target.

4. The method of claim 1, wherein the spectrum analysis operation includes:
a range fast Fourier transform (FFT) processing operation of transforming the digital signal output in the wireless reception operation into a frequency-domain signal in units of chirps and outputting the frequency-domain signal;
a Doppler FFT processing operation of transforming the same frequency components of the frequency-domain signal output in the range FFT processing operation into a frequency-domain signal again and outputting the frequency-domain signal;
a range estimation operation of determining and outputting a beat frequency from the signal output in the range FFT processing operation; and
a Doppler estimation operation of determining and outputting a Doppler frequency from the signal output in the Doppler FFT processing operation.

5. A signal processing method of a time-division-multiplexed (TDM) frequency modulated continuous wave (FMCW) radar apparatus having an antenna array in which transmitting antennas and receiving antennas are arranged such that a plurality of virtual antennas have the same position, the method comprising:
a wireless transmission operation of transmitting FMCW radar waveform signals that are configured such that at least three peculiar chirps included in a chirp loop of each of radar signals transmitted by the plurality of virtual antennas having the same position, are respectively positioned in consecutive time slots and have different periods;
a wireless reception operation of demodulating baseband FMCW radar signals from FMCW radar waveform signals reflected by a target, sampling difference signals between the baseband FMCW radar signals and the transmitted signals, transforming the difference signals into digital signals, and outputting the digital signals;
a spectrum analysis operation of determining and outputting beat frequencies and Doppler frequencies from the signals output in the wireless reception operation; and
a Doppler frequency determination operation of measuring phase differences between the at least three peculiar chirps, which are respectively positioned in consecutive time slots, have different periods, and are received at the plurality of virtual antennas in the wireless reception operation, and determining and outputting a true Doppler frequency from the measured values and the Doppler frequencies output in the spectrum analysis operation,
wherein the Doppler frequency determination operation includes:
a phase difference measurement operation of measuring phase differences between the at least three peculiar chirps respectively positioned in consecutive time slots and having different periods;
a search range calculation operation of determining a search range of Doppler frequencies of an aliased spectrum by a ratio of a maximum Doppler frequency of the target to be detected and a maximum Doppler frequency obtained from a range-Doppler spectrum; and
a Doppler frequency search operation of determining and outputting a Doppler frequency at which a theoretically calculated phase difference value is most similar to a measured phase difference value, from among the Doppler frequencies of the aliased spectrum.

6. A time-division-multiplexed (TDM) frequency modulated continuous wave (FMCW) radar apparatus, comprising:
an antenna array in which transmitting antennas and receiving antennas are arranged such that a plurality of virtual antennas have the same position;
a wireless transmitter configured to transmit FMCW radar waveform signals that are configured such that at least three peculiar chirps included in a chirp loop of each of radar signals transmitted by the plurality of virtual antennas having the same position, are respectively positioned in consecutive time slots and have different periods;

a wireless receiver configured to demodulate baseband FMCW radar signals from FMCW radar waveform signals reflected by a target, sample difference signals between the baseband FMCW radar signals and the transmitted signals, and transform the difference signals into digital signals and output the digital signals;

a spectrum analyzer configured to determine and output beat frequencies and Doppler frequencies from the signal output from the wireless receiver; and a circuitry configured to perform a Doppler frequency determination operation to measure phase differences between the at least three peculiar chirps, which are respectively positioned in consecutive time slots, have different periods, and are received from the plurality of virtual antennas by the wireless receiver, and determine and output a true Doppler frequency from the measured values and the Doppler frequencies output from the spectrum analyzer, wherein the circuitry measures a phase difference between the peculiar chirps from at least three peculiar chirp signals, which are respectively positioned in consecutive time slots and output from the wireless receiver, and determines and outputs the Doppler frequency, at which theoretically calculated phase difference values are most similar to measured phase difference values, as the true Doppler frequency.

7. The TDM FMCW radar apparatus of claim 6, wherein the FMCW radar waveform signals transmitted by the wireless transmitter are configured such that the at least three chirps respectively positioned in consecutive time slots differ in at least one of an idle time between the peculiar chirps or a ramp time of the peculiar chirps.

8. The TDM FMCW radar apparatus of claim 7, wherein the at least three chirps, which are respectively positioned in consecutive time slots, are configured such that a sum of an inter-chirp difference value of the idle time and an inter-chirp difference value of the ramp time is limited by a desired target maximum detection rate of the target.

9. The TDM FMCW radar apparatus of claim 6, wherein the spectrum analyzer includes:
a range fast Fourier transform (FFT) processor configured to transform the digital signal output from the wireless receiver into a frequency-domain signal in units of chirps and output the frequency-domain signal;
a Doppler FFT processor configured to transform the same frequency components of the frequency-domain signal output from the range FFT processor into a frequency-domain signal again and output the frequency-domain signal;
a range estimator configured to determine and output a beat frequency from the signal output from the range FFT processor; and
a Doppler estimator configured to determine and output a Doppler frequency from the signal output from the Doppler FFT processor.

10. A time-division-multiplexed (TDM) frequency modulated continuous wave (FMCW) radar apparatus, comprising:
an antenna array in which transmitting antennas and receiving antennas are arranged such that a plurality of virtual antennas have the same position;
a wireless transmitter configured to transmit FMCW radar waveform signals that are configured such that at least three peculiar chirps included in a chirp loop of each of radar signals transmitted by the plurality of virtual antennas having the same position, are respectively positioned in consecutive time slots and have different periods;
a wireless receiver configured to demodulate baseband FMCW radar signals from FMCW radar waveform signals reflected by a target, sample difference signals between the baseband FMCW radar signals and the transmitted signals, and transform the difference signals into digital signals and output the digital signals;
a spectrum analyzer configured to determine and output beat frequencies and Doppler frequencies from the signal output from the wireless receiver; and
a circuitry configured to perform a Doppler frequency determination operation to measure phase differences between the at least three peculiar chirps, which are respectively positioned in consecutive time slots, have different periods, and are received from the plurality of virtual antennas by the wireless receiver, and determine and output a true Doppler frequency from the measured values and the Doppler frequencies output from the spectrum analyzer,
wherein the Doppler frequency determination operation includes:
a phase difference measurement operation to measure the phase differences between the at least three peculiar chirps respectively positioned in consecutive time slots and having different periods;
a search range calculation operation to determine a search range of Doppler frequencies of an aliased spectrum by a ratio of a maximum Doppler frequency of the target to be detected and a maximum Doppler frequency obtained from a range-Doppler spectrum; and
a Doppler frequency searching operation to determine and output a Doppler frequency at which a theoretically calculated phase difference value is most similar to a measured phase difference value, from among the Doppler frequencies of the aliased spectrum.

* * * * *